United States Patent [19]

Magrobi

[11] Patent Number: 4,912,952
[45] Date of Patent: Apr. 3, 1990

[54] MOTOR VEHICLE THEFT PREVENTION DEVICE

[75] Inventors: Judd M. Magrobi, Johannesburg, South Africa

[73] Assignee: Corporation Beta Y Zeta SA, San Jose, Costa Rica

[21] Appl. No.: 107,046

[22] Filed: Oct. 9, 1987

[30] Foreign Application Priority Data

Oct. 9, 1986 [ZA] South Africa ..................... 86/7701
May 19, 1987 [ZA] South Africa ..................... 87/3589

[51] Int. Cl.⁴ .............................................. B60R 25/00
[52] U.S. Cl. ...................................... 70/199; 70/162; 70/202; 180/287
[58] Field of Search ............................ 70/58, 158–162, 70/199–200, 202–203, 238, 239, 254, 258; 180/287, 289

[56] References Cited

U.S. PATENT DOCUMENTS 4,065,946 1/1978 Loynes ..................................... 70/58
4,632,209 12/1986 Russell ................................... 70/199
4,747,465 5/1988 Hodgson ............................... 70/200

FOREIGN PATENT DOCUMENTS 772555 8/1978 South Africa .

Primary Examiner—Robert L. Wolfe
Attorney, Agent, or Firm—Ladas & Parry

[57] ABSTRACT

A locking device is provided for use in a motor vehicle. A panel is mounted on the floor of the motor vehicle between the vehicle control pedals and the driver's seat, the panel being dimensioned substantially to prevent access to the control pedals. The device includes a hinge mounting for the panel whereby the panel can be hinged out of the way of the pedals and locking means adapted releasably to lock the panel in an operative position in which it prevents access to the control pedals. The locking device includes a vehicle radio theft prevention device comprising a cable adapted for attachment to a vehicle radio or the like and to be fixed releasably to an anchorage provided on the inside of the housing.

5 Claims, 4 Drawing Sheets

MOTOR VEHICLE THEFT PREVENTION DEVICE

BACKGROUND TO THE INVENTION

This invention relates to a motor vehicle locking device and a vehicle radio theft prevention device associated therewith by means of which the theft of the motor vehicle or the radio may be prevented.

SUMMARY OF THE INVENTION

According to the invention a locking device for use in a motor vehicle comprises a panel adapted for removable mounting on the floor of the motor vehicle between the vehicle control pedals and the driver's seat, the panel being dimensioned substantially to prevent access to the control pedals.

The device may include a hinge mounting for the panel whereby the panel can be hinged out of the way and locking means adapted releasably to lock the panel in an operative position, that is in a position in which it prevents access to the control pedals.

The hinge mounting may be on the floor of the motor vehicle so that the panel may be folded flat onto the floor. In such an event, the surface of the panel may be covered with floor mat material. The device may include means automatically to raise the panel to the operative position when, for instance, the vehicle key has been removed from the ignition and the door has been closed. A suitable time delay may be introduced in the panel closing means.

The device preferably includes a bracket assembly adapted for securement to one or more of the floor, the steering column and a bulkhead of the motor vehicle. The hinge mounting may be provided on the bracket portion extending across the floor of the vehicle.

The bracket assembly may be constituted by a substantially closed box or housing, the rear of which is open to allow the mounting of the box over the pedals with the panel hingedly mounted on the front of the box.

The locking device may include a frame member adapted to serve as a lintel against which the panel may close, the frame member being adapted for mounting in the motor vehicle to extend across the front of the control pedals and including a lockable catch or catches on either the panel or the lintel.

The frame member, in the preferred form of the invention, may be mounted on the bracket assembly to extend across the area between the control panel and the driver's seat.

The device may include means to disable one or more of the brake, fuel or ignition systems of the motor vehicle. The brake disabling means may be constituted by a pressure pad or lever mounted on the panel in a position to depress the brake pedal when the panel is locked in its operative position. A similar pressure pad or lever may be used to depress the clutch of the vehicle.

The fuel system and the ignition system may be disabled electrically by means of a disabling switch mounted for depression and activation by the panel when the latter is hinged to the operative position.

The vehicle radio theft prevention device comprises a flexible elongate anchor member adapted to be attached to a vehicle radio or the like and to be fixed releasably to an anchorage in the vehicle, the anchorage being inaccessible to unauthorized persons.

For example, the anchorage may be provided on the inside of a lockable box or housing such as that described above.

The anchor member is preferably a strong flexible cable which is attached to a bracket on the rear of the radio or the like, the cable being detachable from the bracket when it is slack but being secure when the cable is under tension.

BRIEF DESCRIPTION OF THE DRAWINGS

The invention will be further described with reference to the accompanying drawings in which.

DESCRIPTION OF EMBODIMENTS OF THE INVENTION

Figure 1:
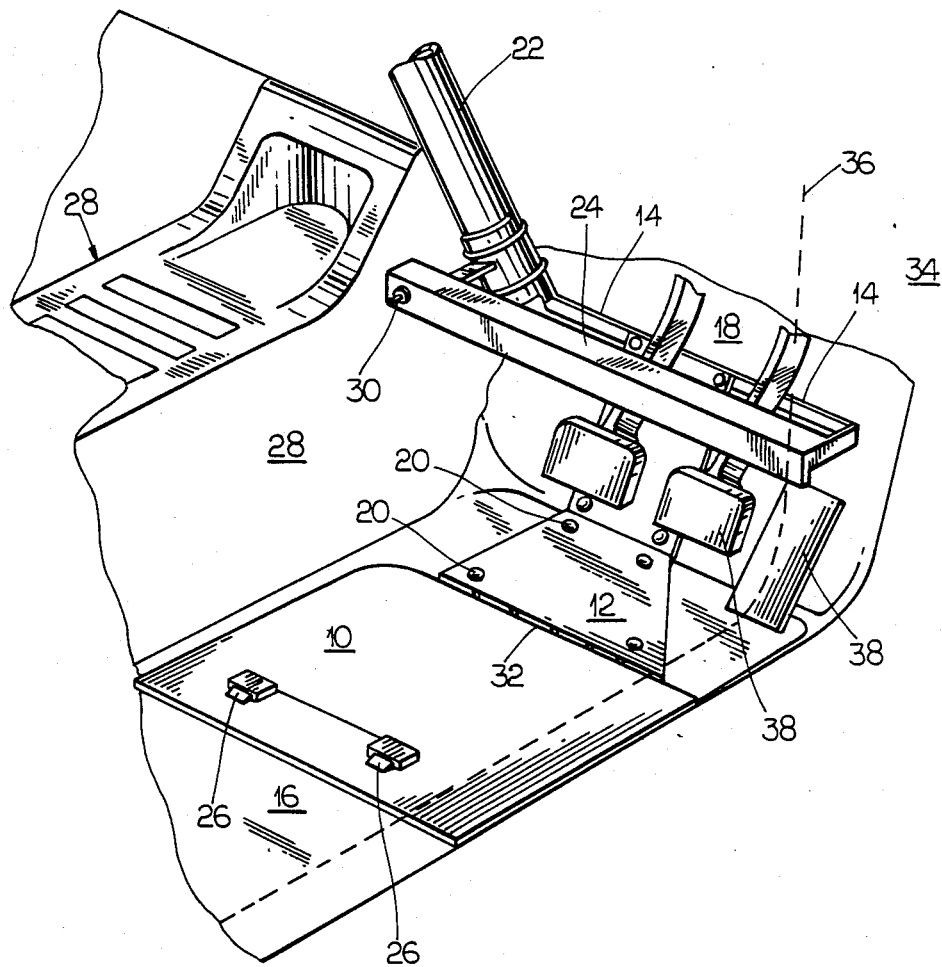
FIG. 1 is a diagrammatic isometric view of one embodiment the locking device of the invention, in the open position.
Figure 2:
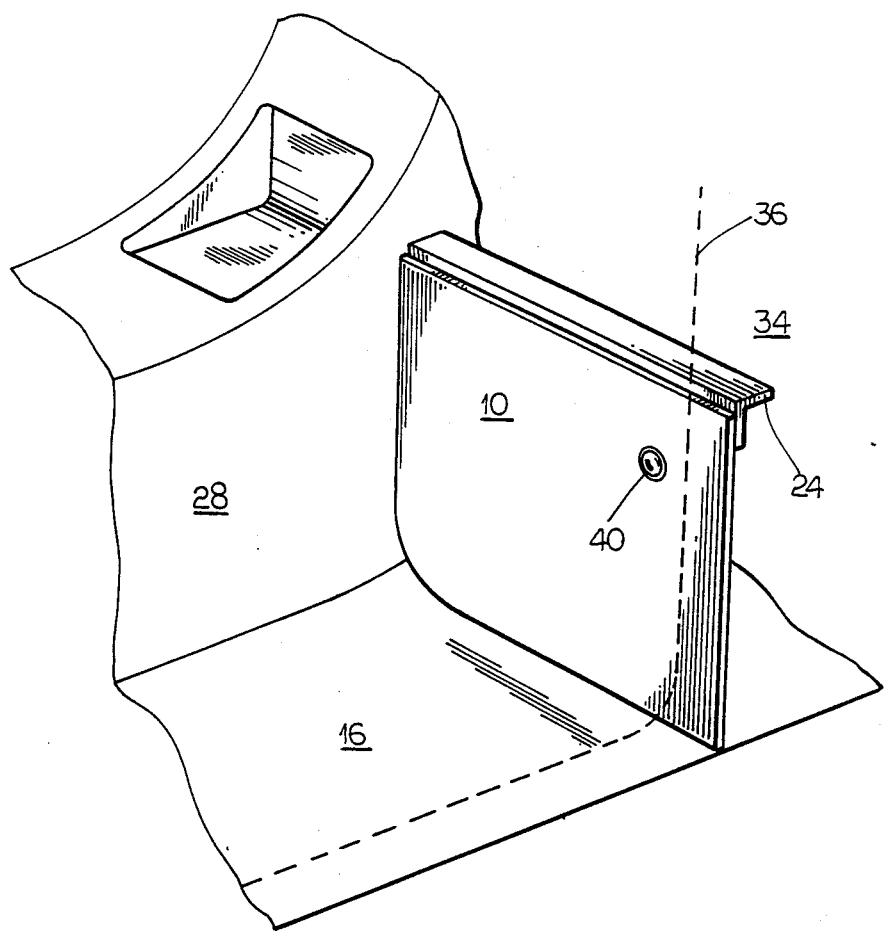
FIG. 2 is a similar view of the locking device of FIG. 1, but with the panel in the locked position.

The locking device shown in FIGS. 1 and 2 comprises a panel 10 of tempered steel hingedly mounted on a bracket assembly comprising a mounting bracket 12 and a number of stabilising brackets 14. The mounting bracket 12 is secured to the floor 16 and the forward bulkhead 18 of the motor vehicle by means of bolts and nuts 20. Round headed bolts are used with the heads projecting towards the outside of the floor- and bulkhead surfaces. To prevent unauthorized access to the heads of the bolts, they may be housed within cup-shaped washers.

The stabilising brackets forming part of the bracket assembly include a bracket secured to the steering column 22 of the vehicle; a bracket secured to the bulkhead 18 and a frame member 24 which extends across the control pedal space, in the nature of a lintel against which the panel 10 closes.

One or two automatically locking catches 26 are provided. These may be mounted either on the panel 10 as shown in the drawing or on the frame member.

The entire locking device may, for the sake of convenience, be boxed in by means of a box (not shown) extending about the sides and rear of the control pedal space. This will enable the use of the locking device of the invention with motor vehicles which do not have a control console similar to the console 28 shown in the drawings.

A disabling switch 30 is shown secured to the frame member 24, the switch being connected to a circuit which disables one or more of the electrical circuits of the motor vehicle, such as the ignition system, the electronic fuel ignition system, where such a system is installed, or the electrical fuel pump, where the vehicle is fitted with such a pump.

To secure the vehicle against theft, the panel 10 is merely flipped up on the hinge mounting 32 until the catches 26 engage the frame member 24. This may be done manually or automatically. The panel 10 is shaped to fit securely against the console 28 and the side bulkhead 34, the limit of which, at the door, is indicated by means of a broken line 36.

The space defined between the panel 10 and the bulkhead 18, with the panel in the locked position is now securely locked and can serve, in addition, as a secure space for valuables.

Access to the control pedals 38 of the motor vehicle can now only be gained by unlocking the panel 10 by means of a lock 40 and folding the panel 10 downwardly onto the floor 16 of the vehicle.

Figure 3:
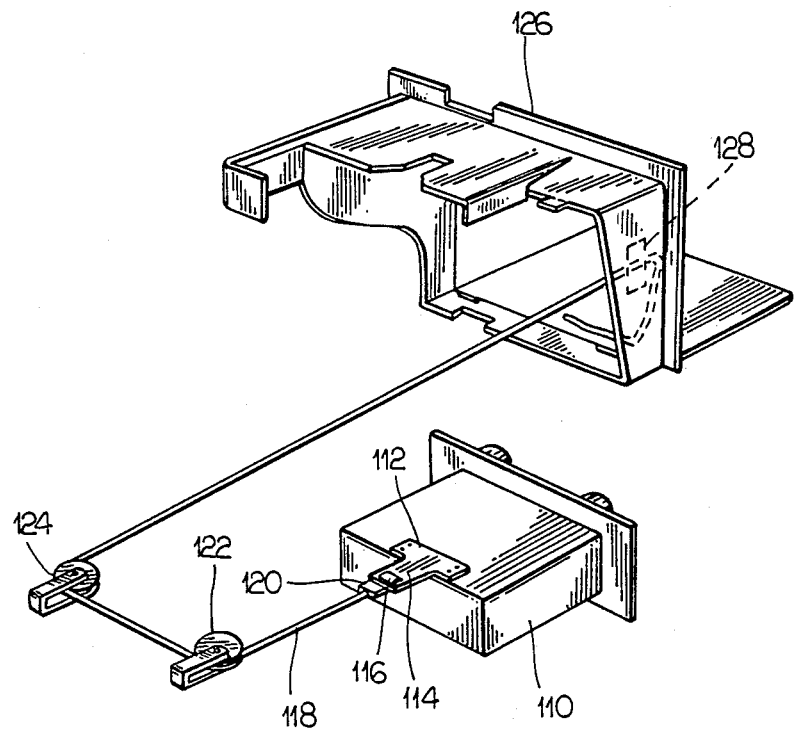
FIG. 3 is a pictorial view of a vehicle radio theft prevention device according to the invention.

FIG. 3 shows the rear of a car radio 110 or the like, to which is fixed a bracket 112. The bracket 112 includes a tab 114 which protrudes beyond the rear of the radio and in which a rectangular slot 116 is formed. A thin high-tensile steel cable 118 is provided at one end with a hook-shaped clip 120 which fits into the slot 116 in the tab 114. When the wire cable 118 is slack, the clip 120 can easily be engaged with or disengaged from the tab 114, but when the cable 118 is under tension, the clip 120 is securely attached to the tab 114.

Figure 4:
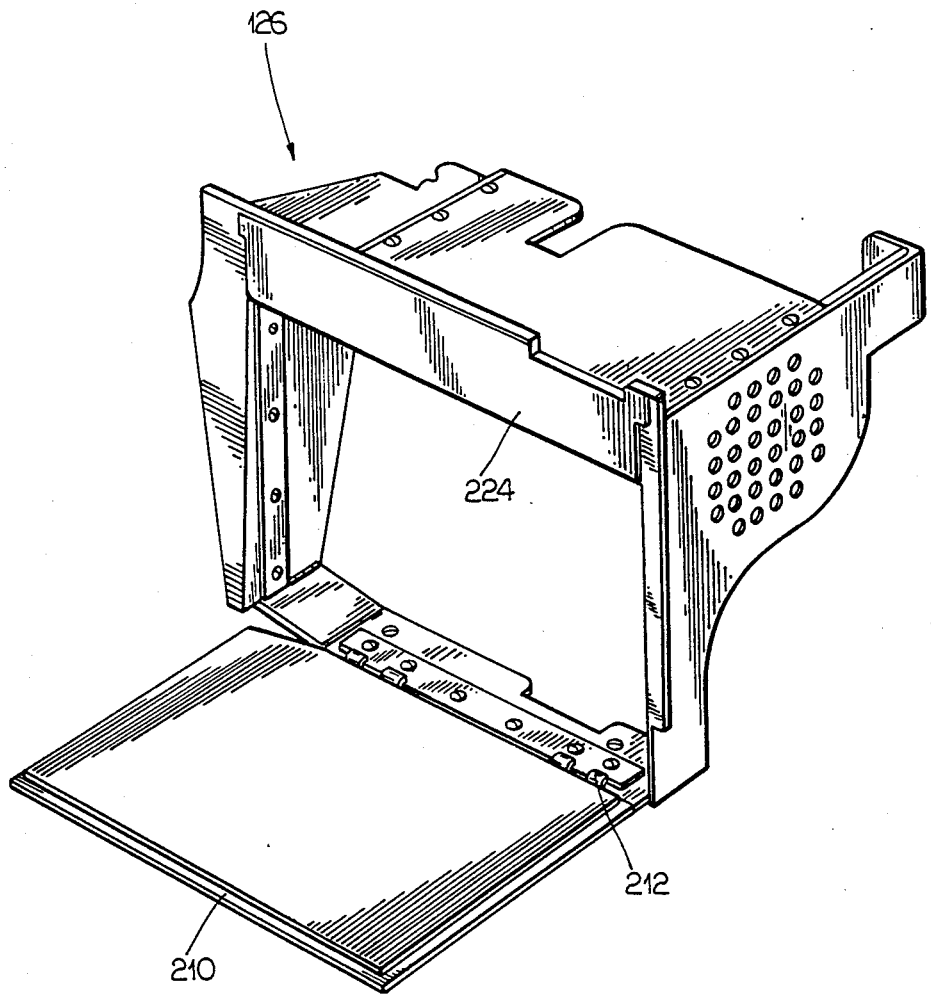
FIG. 4 is an isometric view of a housing, being a second embodiment of the locking device.

The cable extends from behind the radio 110 to a first pulley 122 which is fixed to the firewall of the passenger compartment by means of a shackle or the like. The cable 118 passes arond the pulley 122, and runs parallel to the firewall. The cable 118 then passes into the interior of a metal housing 126 which is secured into the footwell of the vehicle passenger compartment on the driver's side. The housing, which is shown in more detail in FIG. 4, is a strong construction of steel and has a lockable front panel. An anchorage 128 is provided on an inner wall of the housing 126, which allows the cable 118 to be clamped to the inside of the housing 126 by means of bolts or the like.

When the theft prevention device is first fitted, the cable 118 is passed over the pulleys 122 and 124 and the clip 120 is fitted to the tab 114 of the bracket 112 on the rear of the radio 110, while the radio is removed from the dashboard of the vehicle. The cable 118 is of a length which allows the radio 110 to be withdrawn from the dashboard without the free end of the cable 118 passing through the anchorage 128. When the radio 110 is fitted to the dashboard, the cable 118 is simultaneously tensioned. Once the radio 110 is in its correct position, the cable 118 can be securely tightened against the anchorage 128, so that the clip 120 cannot be disengaged from the tab 114. When the driver leaves the car, the housing 126 is locked, so that the anchorage is inaccessible to a thief. Thus, the removal of the radio is made extremely difficult.

Various other forms of clips can be used instead of the illustrated arrangement, which is purely exemplary. The anchorage for the free end of the cable 118 need not be located in a lockable housing as illustrated, but can be concealed in an inaccesible part of the vehicle or protected by an alternative small lockable housing.

The locking device shown in FIG. 4 comprises a housing similar to the housing 126 illustrated in FIG. 3 on which a panel 210 of tempered steel is mounted, by means of a hinge 212 on a bracket assembly forming part of the housing 126, which may be secured to the floor, the forward bulkhead and the steering column of the vehicle in the manner that the locking device shown in FIGS. 1 and 2 is secured. A frame member 224 extends across the control pedal space in the form of a lintel extending across the top of the housing 126.

Automatically locking catches (not shown) may be secured either to the panel 210 or to the lintel 224 in the manner described above and the housing 126 is shaped to fit securely within the control pedal space underneath the dashboard of the vehicle The operation of the locking device constituted by the housing 126 is similar, in virtually all respects, to the operation of the locking device described with reference to FIGS. 1 and 2.

I claim:

1. A locking device for a motor vehicle including floor mounted control pedals, the locking device comprising an open frame, which is adapted for securement to one or more of the floor, a steering column and a bulkhead of the motor vehicle, the frame including base and lintel parts located, respectively, below and above a framed opening and the device including a panel which, on one side thereof, is provided with locking means adapted releasably to engage complementary locking means on the lintel, the other side of the panel being hingedly mounted on the base for pivotable movement between an open position, in which the framed opening is open to enable operator access to the control pedals, and a closed position, in which the framed opening is closed by the panel and the locking means on the panel and the lintel are engaged, to deny operator access to the control pedals.

2. A locking device according to claim 1 for a motor vehicle in which the control pedals are located within a control pedal space bordered above and below by a dashboard and the floor, on the sides, by an upstanding console and a door frame panel, at the rear by a bulkhead of the vehicle and at the front by an imaginary plane extending the front of the control pedals, the locking device frame and the hinged panel being adapted to occupy substantially the entire imaginary plane extending across the front of the control pedals, when the panel is in the closed position.

3. A locking device according to claim 1 in which the frame is integral with the front end of a substantially closed housing, the rear of which is open to allow the mounting of the housing over the control pedals, the panel being hingedly mounted on the frame on the front of the housing.

4. A locking device according to claim 1 for a motor vehicle in which the control pedals are located within a control pedal space bordered above and below by a dashboard and the floor, on the sides, by an upstanding console and a door frame panel, at the rear by a bulkhead of the vehicle and at the front by an imaginary plane extending across the front of the control pedals, the locking device frame and the hinged panel being adapted to occupy substantially the entire imaginary plane extending across the front of the control pedals when the panel is in the closed position and the frame being integral with the front end of a substantially closed housing, the rear of which is open to allow the mounting of the housing over the control pedals, the panel being hingedly mounted on the frame on the front of the housing.

5. A locking device according to claim 1 which includes an ignition system disabling switch which is mounted on the lintel for depression and activation by the panel when the panel is hinged to the closed position.

* * * * *